United States Patent [19]

Levine

[11] 4,455,011

[45] Jun. 19, 1984

[54] H-SHAPED BRACKET WITH SLIDABLE REINFORCING NUT

[76] Inventor: Fred Levine, 1330 99th St., Bay Harbor Islands, Fla. 33154

[21] Appl. No.: 234,108

[22] Filed: Feb. 12, 1981

Related U.S. Application Data

[60] Continuation-in-part of Ser. No. 50,503, Jun. 20, 1979, Pat. No. 4,260,125, which is a division of Ser. No. 868,267, Jan. 5, 1978, Pat. No. 4,174,821, which is a continuation-in-part of Ser. No. 692,271, Jun. 3, 1976, Pat. No. 4,076,196.

[51] Int. Cl.³ .......................................... F16M 13/00
[52] U.S. Cl. .................................... 248/646; 248/674
[58] Field of Search ............... 248/56, 57, 300, 258, 248/259, 262, 646, 660, 661, 662, 669, 674, 675, DIG. 6; 411/174, 175, 525, 526, 527, 528, 529, 539

[56] References Cited

U.S. PATENT DOCUMENTS

| | | | |
|---|---|---|---|
| 1,156,885 | 10/1915 | Caine | 248/57 X |
| 1,248,320 | 11/1917 | Hamilton | 248/254 |
| 1,622,087 | 3/1927 | Calderwood | 248/57 |
| 2,155,627 | 4/1939 | Welch | 248/DIG. 6 |
| 2,161,955 | 6/1939 | Dunham | 248/646 |
| 2,316,389 | 4/1943 | Atkinson | 248/300 |
| 2,378,257 | 6/1945 | Tinnerman | 411/174 |
| 2,697,862 | 12/1954 | Flora | 248/56 |
| 2,722,394 | 11/1955 | Titmas | 248/214 |
| 2,920,853 | 1/1960 | Bufogle | 248/287 X |
| 3,043,970 | 7/1962 | Hatten | 310/91 |
| 3,432,705 | 3/1969 | Lindtveit | 310/91 |
| 3,434,723 | 3/1969 | Janssen et al. | 310/91 |
| 3,436,570 | 4/1969 | Engels | 310/90 X |
| 3,465,182 | 9/1969 | Church et al. | 310/51 |
| 3,482,127 | 12/1969 | Dochterman | 310/91 X |
| 3,500,083 | 3/1970 | Dochterman | 310/51 |
| 3,503,577 | 3/1970 | Martin | 248/646 |
| 3,746,289 | 7/1973 | Johnsen | 248/674 X |
| 3,787,014 | 1/1974 | Story | 310/91 X |
| 3,903,443 | 9/1975 | Carlson | 248/662 X |
| 4,076,196 | 2/1978 | Levine | 248/675 |
| 4,138,857 | 2/1979 | Dankowski | 248/646 X |
| 4,174,821 | 11/1979 | Levine | 248/300 X |
| 4,188,658 | 2/1980 | Aron | 248/DIG. 11 |
| 4,260,125 | 4/1981 | Levine | 248/675 |

FOREIGN PATENT DOCUMENTS

| | | | |
|---|---|---|---|
| 218515 | 3/1957 | Australia | 248/57 |
| 334250 | 9/1930 | United Kingdom | 248/662 |
| 718958 | 11/1954 | United Kingdom | 411/539 |

*Primary Examiner*—William H. Schultz
*Attorney, Agent, or Firm*—Harvey B. Jacobson

[57] ABSTRACT

An adjustable mounting bracket for small horsepower motors, such as those used to drive fans in refrigerators, or the like, in the form of an H-shaped bracket having a plurality of longitudinally extending slots therein with the endmost slots having an open end to facilitate entry and exit of a fastening bolt, machine screw, or the like. The slotted bracket also slidably receives a nut, such as a sheet metal nut, or the like, which may be in the form of a clip that is longitudinally adjustably supported on the bracket and serves as a reinforcement when used in conjunction with the open end slot. The H-shaped bracket can be easily deformed or bent into a desired configuration to accommodate a fan blade, or the like, having a very deep pitch to avoid interference between the bracket and such a fan blade. The bracket may be associated with the existing motor and mounting screws in various arrangements with the slots in the bracket capable of being manufactured in different sizes to closely receive different size machine screws.

3 Claims, 6 Drawing Figures

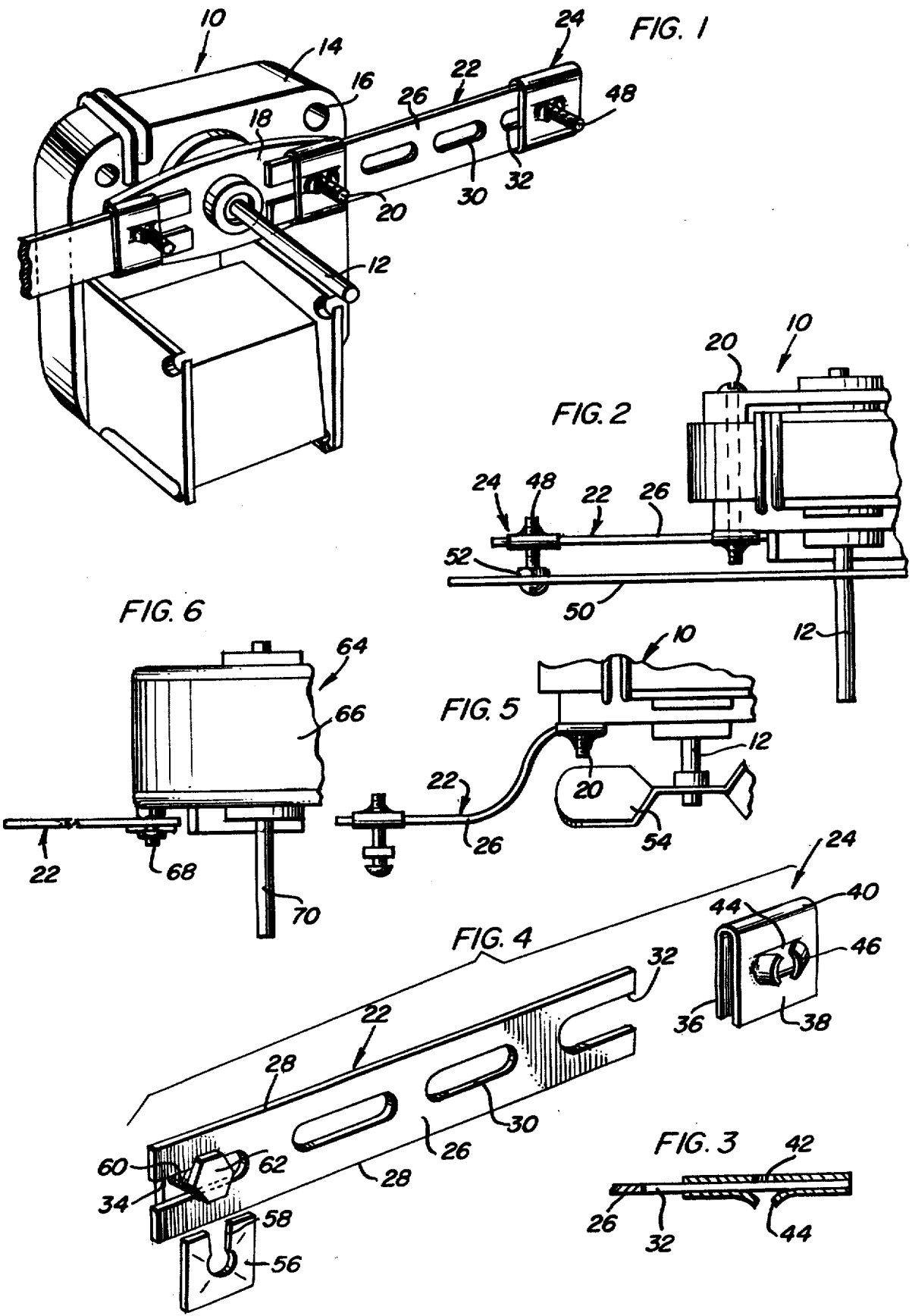

H-SHAPED BRACKET WITH SLIDABLE REINFORCING NUT

CROSS REFERENCE TO RELATED APPLICATIONS

This application is a continuation-in-part of my co-pending application Ser. No. 050,503, filed June 20, 1979, for Brackets for Mounting Motors now U.S. Pat. No. 4,260,125 issued Apr. 7, 1981 which was a division of Ser. No. 868,267, filed Jan. 5, 1978, which issued as U.S. Pat. No. 4,174,821, on Nov. 20, 1979, which was a continuation-in-part of Ser. No. 692,271, filed June 3, 1976, which issued as U.S. Pat. No. 4,076,196, on Feb. 28, 1978.

BACKGROUND OF THE INVENTION

1. Field of the Invention

The present invention generally relates to an adjustable and versatile mounting structure for small horsepower electric motors, such as fan motors for use in refrigerators, freezers, air conditioners, and the like, which has preformed holes therein receiving mounting screws or which has a casing or housing with threaded studs projecting therefrom with the mounting structure of the present invention including an H-shaped bracket combined with a nut in the form of a clip which is slidable along the bracket to rigidify and reinforce an open-ended slot with the supporting screw for the motor extending through the nut and slot and/or a C-shaped washer which can be slid under a nut or bolt head without removal of the nut or bolt which is necessary when assembling an annular washer with a nut and bolt assembly.

2. Description of the RELEVANT INFORMATION

In my U.S. Pat. No. 4,076,196, issued Feb. 28, 1978, and U.S. Pat. No. 4,174,821, issued Nov. 20, 1979, and in my co-pending application Ser. No. 050,503, filed June 20, 1979, there is disclosed bracket structures for mounting electric motors by the use of various types of brackets. The disclosure in these patents and co-pending application is incorporated herein by reference thereto and the prior art cited during prosecution of the applications is also incorporated herein by reference thereto.

SUMMARY OF THE INVENTION

An object of the present invention is to provide an H-shaped mounting bracket for small horsepower electric motors in which the bracket structure includes longitudinally extending slot-like openings with at least one of the slots being open-ended and the slots adjustably slidably receiving a nut in the form of a clip, such as a Tinnerman nut, which receives a supporting screw that also extends through the slot in the bracket and which may be associated with preformed mounting holes in the motor or may be a threaded stud projecting from a motor casing.

Another object of the invention is to provide an H-shaped mounting bracket of sheet metal construction having sufficient rigidity to effectively support a small horsepower electric motor such as those used as a fan drive motor in refrigerators, freezers, air conditioners, and the like, with the bracket being capable of being bent or deformed to enable it to be used in a versatile manner depending upon the installational requirements encountered, such as when replacing a motor which has a different supporting arrangement from the original motor.

A further object of the invention is to provide a mounting bracket in accordance with the preceding objects in which the slots may have different widths to receive different sizes of standard supporting screws or bolts used in supporting small horsepower electric motors from partition walls or other supporting structures.

Yet another object of the invention is to provide an H-shaped mounting bracket with a slidable reinforcing nut mounted thereon and/or a C-shaped washer which can be slid laterally onto a bolt, which is simple in construction, capable of use in many and varied installations and quite inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a motor with a pair of mounting brackets in accordance with the present invention associated therewith.

FIG. 2 is a fragmental plan view of one side portion of the motor illustrating the association of the mounting bracket therewith.

FIG. 3 is a detailed sectional view through one end of the mounting bracket illustrating the open ended slot and slidable nut thereon.

FIG. 4 is an exploded perspective view illustrating the H-shaped slotted bracket and the nut and C-shaped washer and bolt associated therewith.

FIG. 5 is a plan view similar to FIG. 2, but illustrating the mounting bracket deformed to offset the motor to accommodate a deep pitch fan.

FIG. 6 is a fragmental plan view illustrating the bracket used with a motor having a casing with threaded studs affixed thereto.

DESCRIPTION OF THE PREFERRED EMBODIMENT

Referring now specifically to the drawings, a conventional small horsepower fan motor 10 is disclosed which includes an output shaft 12 connected with a rotor and including a stator 14 having preformed openings 16 for receiving mounting screws, or the like, and bearing brackets 18 are also provided through which machine screws or other supporting screws 20 extend with these screws also extending through the stator in a well-known manner. The H-shaped bracket of the present invention is generally designated by numeral 22 and includes a slidable sheet metal nut 24 thereon, such as a Tinnerman fastener, which is longitudinally slidable along the length of the bracket.

The bracket 22 includes an elongated sheet metal strap member 26 having sufficient rigidity to support the motor 10 and being generally in the form of a rectangular member having planar surfaces and opposite edges which are parallel as indicated by numeral 28 and a plurality of slots 30 are provided in the strap member 26 with the slots 30 being along the center line thereof and longitudinally spaced with endmost slots 32 and 34 being open-ended with the slot 32 being slightly wider than the slot 34 in order to receive different sizes of standard machine screws. For example, the wider slot 32 may receive a No. 10 machine screw, while the slot 34 may receive a No. 6 machine screw.

The nut 24 is of generally U-shaped construction and includes spaced walls 36 and 38 interconnected by a bight portion 40 with the wall 36 including an aperture 42 and the wall 38 including struck-out tongues 44 which terminate in edge portions 46 that engage the screw threads on a mounting screw 48 in a well-known manner with the nut 24 being conventional in and of itself and slidably supporting itself on the strap member 26 with the inherent resiliency of the metal from which the nut 24 is constructed serving to adjustably and frictionally retain the nut 24 in longitudinally adjusted position on the strap member 26.

FIG. 2 illustrates the use of the H-shaped bracket 22 to support a motor 10 from the supporting partition, wall, or the like, 50 with the motor shaft 12 projecting therethrough and receiving a fan blade, or the like, not shown. In this arrangement, the screw 48 extends through the wall 50 and is retained rigidly thereon by a retaining nut 52. Also as illustrated in FIG. 2, the mounting screw 20 for the motor 10 extends through a nut on the opposite end of the H-shaped bracket. As illustrated in FIG. 2, the H-shaped bracket 22 is straight, but in the illustration in FIG. 5, the H-shaped bracket 22 has been deformed to provide an offset between the ends thereof which facilitates use of the bracket with a deep pitch fan 54 on the shaft 12 so that the bracket and fan blade will not interfere with each other. FIG. 4 illustrates a C-shaped washer 56 with a laterally extending notch 58 therein which enables the washer 56 to be slid laterally onto a bolt or stud 60 under a head 62 or nut by merely loosening the nut rather than completely removing the nut or bolt as when placing a conventional annular washer on a bolt. The shape of the washer 56 may vary as long as notch 58 will receive the bolt.

The H-shaped bracket is quite versatile in use and may be easily inserted under the head of any mounting screw by merely loosening the screw and sliding the open-ended slot under the screw head or under any retaining nut on the screw. The slot construction provides for longitudinal adjustment of the mounting screws and pivotal movement of the brackets in relation to the mounting screws so that the mounting screws such as those extending through the open-ended slots can swing in an arc about another screw and the bracket and/or screws can be adjusted to adjust the effective distance between the mounting screws or length of the bracket. Also, as illustrated in FIG. 6, the bracket 22 may be used with a motor 64 of the type having a cylindrical housing or casing 66 with threaded studs 68 fixed thereto and projecting therefrom in generally parallel relation to the drive shaft 70. The mounting bracket is very easy to install in the field and enables various field installation problems to be overcome and the open-ended slot eliminates the necessity of completely removing a machine screw to place it through a mounting bracket. The bracket can be used with various types of Tinnerman nuts or other sheet metal nuts or any other conventional nuts. Further, the bracket 22 may be constructed of requisite strength to support various types of motors and may be provided in various lengths so that substantially all installation requirements may be satisfied with a minimum number of brackets.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a small horsepower electric motor having an output shaft and predetermined apertures extending through the stator for receiving mounting fasteners or a casing with predetermined studs, said shaft having a fan mounted thereon for rotation therewith for use in a refrigerator, cooler, air conditioner, or the like, having predetermined apertures provided for receiving motor mounting fasteners arranged in non-aligned relation to the apertures in the motor stator or the studs on the casing, a bracket in the form of an elongated strap member of rigid construction and having a plurality of slots therein with at least one endmost slot being open, a nut slidably adjustably mounted on the bracket and encircling the major portion of the periphery of the strap member to rigidify and reinforce the open-ended slot, said nut including spaced openings with one of them defining means engaging a screw threaded fastener or stud after it extends through the other opening in the nut and the slot in the bracket to support the motor from the non-aligned apertures.

2. The combination as defined in claim 1 wherein said nut is constructed of metal with its inherent resiliency serving to frictionally retain the nut in adjusted position on the bracket, certain of said slots being narrow and certain of said slots being wider to receive different sizes of screw threaded fasteners, said rigid strap member being bendable to enable portions thereof to be offset to eliminate interference with the fan on the motor shaft.

3. The combination as defined in claim 2 wherein said slots are oriented along the center line of the strap member with each endmost slot having an open outer end, one of said open ended slots being narrow and the other open ended slot being wider, and a washer having a laterally extending notch enabling the washer to be slid laterally onto the screw threaded fastener intermediate its ends.

* * * * *